United States Patent [19]

Fischer et al.

[11] Patent Number: 5,388,542
[45] Date of Patent: Feb. 14, 1995

[54] WATER-BORNE SHIP AND METHOD OF OPERATION THEREOF

[75] Inventors: Frank Fischer; Knut Drohula; Harm Lüneburg, all of Hamburg, Germany

[73] Assignee: Blohm + Voss AG, Hamburg, Germany

[21] Appl. No.: 126,180

[22] Filed: Sep. 23, 1993

[30] Foreign Application Priority Data

Sep. 23, 1992 [DE] Germany .................. 4231837

[51] Int. Cl.6 .............................................. B63B 13/00
[52] U.S. Cl. ........................ 114/183 R; 210/804; 210/805
[58] Field of Search ............. 114/183 R, 74 A, 74 R, 114/125, 269; 210/800, 804, 805, 538, 540, 258, 259; 440/4

[56] References Cited

U.S. PATENT DOCUMENTS

| | | | |
|---|---|---|---|
| 3,129,682 | 4/1964 | Penney | 114/269 X |
| 3,472,765 | 10/1969 | Budd et al. | 210/7 |
| 4,139,463 | 2/1979 | Murphy et al. | 210/258 X |
| 4,261,820 | 4/1981 | Geurtsen | 210/259 X |
| 4,309,914 | 1/1982 | Hiersig et al. | 440/4 X |
| 4,315,822 | 2/1982 | Jaisinghani | 210/804 X |
| 4,426,293 | 1/1984 | Mason et al. | 210/636 |
| 4,909,950 | 3/1990 | Katoh et al. | 210/805 X |
| 5,149,447 | 9/1992 | Mashayekhi et al. | 210/805 X |
| 5,207,917 | 5/1993 | Weaver | 210/800 X |
| 5,227,071 | 7/1993 | Torline et al. | 210/804 X |

FOREIGN PATENT DOCUMENTS

| | | |
|---|---|---|
| 2026886 | 2/1980 | United Kingdom . |
| 2257375 | 1/1993 | United Kingdom . |
| 8703503 | 6/1987 | WIPO . |

*Primary Examiner*—Sherman Basinger
*Attorney, Agent, or Firm*—Nils H. Ljungman & Associates

[57] ABSTRACT

A ship typically is constructed with an outer hull, and an inner hull which defines the usable space of the ship. Between the outer hull, and the inner hull, the ship will generally have a low point, or bilge, for collection of any water which gets onto the ship. Therefore, one of the chambers of the ship can preferably be outfitted with processing equipment for cleaning the bilge water. The apparatus and associated method for cleaning the bilge water generally involves at least a gravity separation in a gravity separation chamber to separate at least some oil from the bilge water. Since a gravity separation is generally not sufficient to produce environmentally safe water, the ship can also be equipped with a further filtering arrangement for further processing of the bilge water.

9 Claims, 3 Drawing Sheets

WATER-BORNE SHIP AND METHOD OF OPERATION THEREOF

BACKGROUND OF THE INVENTION

1. Field of the Invention

This invention generally relates to a ship, and more particularly to a ship having a bilge area located within the hull adjacent the bottom thereof. Such a bilge area can typically be located at a lowest point within the hull and therefore can be used as a collection site for water which may leak into the hull, Such water then generally needs to be transported from bilge to insure that equipment, etc, located in chambers above the bilge does not get wet.

2. Background Information

In a typical ship construction, the ship will have an outer hull which is generally water-tight, along with what could be termed an inner hull that defines the interior dimensions of the ship, that is, the walls and floors of the various compartments which make up the interior of the ship. An inner hull can also serve as a second means for protecting the ship from taking on water if the outer hull should be ruptured, such as during a collision, etc. The compartments within the ship can essentially comprise several holds for storage of goods, as well as machinery rooms, such as the engine room wherein the ships engines are located.

Because a ship will more than likely take on some water, either because of small leaks in the hull, rainstorms, or even large waves which may wash up on board, the interior space of the ship, such as a space between the ship's inner and outer hulls, can typically be designed to include a bilge area for collecting the undesired water. In order to protect the equipment, etc. from getting wet should the water level increase to an undesirable level, the bilge area can also be outfitted with pump devices which can pump the water out of the bilge. It is generally desirable to pump this water from the bilge off of the ship, as space on board is typically limited, and storage space for water would prohibit the ships space from being used for transporting cargo, etc. However, because of all of the machinery on board, there is also a good possibility that at least some oil, or other substances used on board will leak into the water drainage system, thus contaminating the water and making the water generally environmentally unsafe to pump directly back overboard, without first treating the water to remove the contaminants therefrom. In addition, the water and oil mixture can also be emulsified, that is, the oil can be distributed as fine droplets throughout the water, thereby making separation even more difficult. Therefor, a ship will generally need to be outfitted with some type of separating apparatus for cleaning the water. The type of separation for cleaning the water can essentially be based on a gravity separation of the oil from the water.

It is well known that bilge water contaminated with oil cannot be pumped overboard without first having been treated to remove the contaminants therefrom. That is, the bilge water must typically first be cleaned before it is dumped, so that the contaminants therein do not pollute the environment, i.e., the ocean, or a canal system if the vessel is operating on inland waterways. However, there are many difficulties with known cleaning methods, because the oil cannot be easily separated to the desired degree using gravity separation as the principle separation step. The primary reason for this problem is that bilge water tends to contain chemical components consisting of cleaning agents, additives from the engine coolant and anti-corrosion agents, which components can promote the formation of an emulsion consisting of water and oil, and thus further complicate separation of the oil from the water.

Methods currently used to clean oily bilge water by gravity separation are complex and expensive, and the known methods are generally still unsatisfactory because they leave an excessive amount of oil in the allegedly clean water.

OBJECT OF THE INVENTION

The object of the invention is therefore to provide a ship with apparatus which can economically and reliably achieve a high degree of cleaning of the bilge water, so that the cleaned water does not pollute the sea water when it is dumped into the ocean, or does not otherwise harm the environment when it is dumped into an inland canal system.

SUMMARY OF THE INVENTION

The present invention provides that this object can be achieved on board a ship by apparatus, and an associated process which utilizes gravity separation along with further separation steps in addition to the gravity separation. In general, a gravity separation of oil from bilge water can be performed in a container which is preferably part of a system equipped with pumps and monitoring devices, whereby after the start of the separation of the oil fraction from the bilge water, the water which has only been pre-cleaned in the gravity separation container, can preferably be continuously pumped out of the separation container and transported to an additional cleaning apparatus.

It has been determined that if a fine filter is used for the secondary cleaning, in accordance with the present invention, a substantially pure water can be achieved, which can be pumped back into the surrounding water. In accordance with the present invention, in the secondary cleaning, or filtering stage, the partially cleaned bilge water from the gravity separation tank can preferably be kept circulating under elevated pressure, thereby forcing water through the filter to clean the water, while the bilge water remaining behind becomes more concentrated with oil. This more concentrated bilge water can be continuously pumped back from the "dirty" side of the fine filter into the separation tank. The floating oil in the separation tank can be pumped off, and the flow velocity in the entire system is preferably kept low, so that the separation process in the tank remains substantially unaffected by the flow of the circulating fluids.

In other words, after the start of the separation of the oil fractions from the bilge water in the separation tank, the water which has only been pre-cleaned in the separation tank can continuously be pumped out of the separation tank and transported to a fine filter for further cleaning. In the filter system, the water can preferably be kept in circulation under elevated pressure. As a portion of the contaminated bilge water passes through the filters, by which it is cleaned, the concentration of oil in the remainder of the bilge water which does not pass through the filters increases. This contaminated fraction is preferably continuously pumped from the "dirty" side of the fine filter back into the separation tank, while the clean water can be drawn off from the "clean" side of the filter. In the separation tank, the concentrated oil can then float to the surface from where the oil can be pumped off, as discussed above. During the entire process, the flow velocity in the system is kept low enough that the separation process in the tank will not be affected by the flow of the medium.

During each cleaning of a specified quantity of bilge water, the process therefore preferably takes place continuously, i.e. without an interruption of the process, although the cleaning is divided into steps or segments. Once at least a portion of the oil separates from the bilge water in the separation tank, and has generally collected on top of the water, the remainder of the process, which forms the core of the present invention, begins. That is, the bilge water, pre-cleaned by gravity in the separation tank, can then be pumped through a fine filter system, which utilizes a filter with high separation capabilities. In this secondary system, the bilge water can circulate, under elevated pressure, separately from the water still in the separation tank, and can be cleaned by the filter elements until the water has reached a desired high purity.

The concentrated oil which generally tends to form on a filter as a layer of dirt, is substantially inhibited from forming by the present invention in which this concentrated oil is pushed through the filter system at a velocity which is sufficient to keep the surface substantially free of deposits, and pumped back into the separation tank, also continuously, wherein the oil can then be separated by gravity. This more concentrated oil fraction is preferably pumped back to the separation tank before a conventional "filter cake" has formed as a layer of solid matter. Back in the separation tank, at least a portion of the oil from the oil fraction can then float to the top of the returned bilge water, which still has good flow characteristics, just like the oil which previously floated to the top of the untreated bilge water. Like the previously separated oil, the additional separated oil can also be continuously pumped out.

The process thereby provides for a continuous circulation of the bilge water between the separation tank and the fine filter, while also providing a substantially closed circulation within the fine filter system. In a fine filter system, an increased pressure and fluid flow are typically necessary to achieve a desired separation. Therefore, to achieve the high degree of purity in the fine filter system, the pressure in the filter circuit should preferably be able to be increased, while not interfering with the gravity separation. In general, the flow velocity in the overall system must be kept low enough so that the separation of the oil from the bilge water in the separation tank is not adversely affected by an excessively rapid flow of the medium.

To be able to conduct the cleaning process without any interruptions or disruptions, the filter is essentially continuously cleaned during operation, and, when necessary, can be regenerated by a flow of clean water delivered at the required elevated pressure. The coarse oil particles can then be flushed out of the filter and back into the separation tank.

To promote the cleaning process, a flushing agent can be added to the clean water used for flushing the filter. Such flushing agents are generally known in the cleaning of filters, and are not further discussed herein. In addition, the flushing water can also advantageously be heated. Following this cleaning process, the contents of the separation tank can preferably be transported through a solid materials filter to remove any accumulated solid materials. The bilge water, which has thus been pre-cleaned of any solid materials, can then be returned to the separation tank for further treatment, or to the bilge, for later treatment.

The process will now be described in greater detail. In effect, the principle of the process according to the present invention is a combination of gravity separation and a downstream dynamic filtration, in this case microfiltration. This filtration is also called crosscurrent filtration, i.e. the cleaned water passes through the filter at an angle, or on a tangent to the main current flowing through the filtration apparatus. The corresponding system can comprise a combination tank, a clean water tank, a flushing agent tank, as well as a module or membrane unit.

The combination tank essentially has the following functions:

1. Removal of coarse oil particles and solid matter;
2. Storage of the dirty water expelled from the modules before and after the cleaning;
3. Collection of the separated oil; and
4. Services as the storage tank for the membrane circuit.

There are preferably several individual membrane tubes in the filter module housing. The filter tubes can preferably have a microfine ceramic coating applied to the insides thereof. This microfine ceramic coating essentially represents, or acts as a membrane. Such ceramic coated membranes are generally known, and the construction thereof is not disclosed in any further detail herein. Such ceramic filters can be used for the separation of oil-water emulsions, as per the present invention, because these membranes can accept a correspondingly high overflow, or through flow of fluids. The pressure drop which occurs in the tubes is acceptable. During filtration processes, oil-water emulsions generally tend to form a more or less thick cover coating on the filter surfaces. A cover coating in this sense means that the individual oil molecules are packed so densely together that the water is more difficult to transport through the membrane or through the cover coating. To keep this cover coating down, the present invention provides that the flow through the tube or the membrane has a sufficiently high overflow velocity to inhibit formation of a filter deposit. Such a velocity can typically be on the average of about 4 meters per second to about 5 meters per second. In essence, depending on the size of the filter module, the type of module, and the desired degree of separation, this velocity can possibly be any one of: about 2 m/s, about 3 m/s, about 4 m/s, about 5 m/s, about 6 m/s, about 7 m/s, or greater.

Other membrane or module systems can also be used, but, since such systems are generally operated with lower overflows, they tend to have the disadvantage that they form high concentrations of the individual oil components and solid particles, and thus cause a rapid clogging of the system. These are called winding, plate or high fiber modules.

Since the overflow in the tube modules can be relatively high, in the module sizes used on a working scale, this tends to result in a relatively high volume flow. For example, the flows in such a case could be on the order of about 50 cubic meters per hour to about 100 cubic meters per hour.

Operation of the filter module, or membrane system, is further outlined below.

The water can be permeated through the filter membrane, that is, the water can either be allowed to flow freely through the filter membrane, or can forced through the membrane by a pressure gradient. The result is that the oil concentration in the module or membrane circuit increases with time, since water is leaving the system. As the oil concentration increases, the flux or permeate flow through the membrane will tend to decrease, according to certain regularities. The purpose of such a membrane filtration is essentially always to achieve a high filtration performance with a low pressure gradient and a small pressure loss. To counteract this increase in the oil concentration, fresh emulsion must generally be added from the separation tank, a storage tank or other similar device, and a corresponding amount of the more concentrated oil mixture should preferably be discharged from the module. This can generally be done by performing the separation as a batch process, i.e. the filter module is preferably fed by means of a pump from a relatively large supply tank. This process can generally always be followed by a densification process, during which preferably no new fluid is added to the storage tank.

Since this system is primarily intended to make possible the separation of oil from the water in the combination tank, the process is based on the following principle:

So that current volumes in a range between about 50 cubic meters per hour and 100 cubic meters per hour do not flow back into the combination tank and thus make a downstream gravity separation impossible, the volume of the current stream to be discharged is reduced to about 500 to about 1500 liters per hour, which can be similar to the volume extracted from the combination tank. An equivalent amount can then be, in turn, removed from the filter module or the membrane circuit. For this purpose, a second pump is typically needed, which pump can be designed so that it can exert a higher pressure within the filter module system.

The concentrated oil-water mixture or the emulsion is then fed out of the filter module back into the combination tank, and there, on account of the characteristics of the tank, the mixture encounters relatively good separation conditions, since on account of the reduced flow velocity, the separation processes proceed so that at a higher concentration, e.g. 1–2% oil, free oil can collect in the oil dome, so that a specified concentration can always be kept constant in the combination tank.

Free oil which can be delivered by the corresponding bilge pump from the bilge, that is, oil which is not emulsified, can be pumped directly into the combination tank, and the coarse oil particles will generally readily ascend into the oil collection dome. This free oil thereby preferably does not get into the membrane circuit.

A collection tank which is frequently necessary in comparable gravity separation processes is essentially not necessary with the process according to the present invention, because the oil removal system with the downstream membrane system practically completely replaces a conventional separator. In this process, solid matter which gets into the combination tank is usually also flushed into the membrane. These solid materials tend to form a corresponding percentage of the cap layer, and care must therefore be taken that this concentration does not increase too much. This can be largely prevented by the subsequent process step. When the membrane has become contaminated to the point where cleaning becomes necessary, the following process steps can be performed:

1. The combination tank can be emptied by filtration until there is a corresponding buffer volume available.

2. A certain amount of water can be removed from the clean water tank and used to force the dirty water out of the module, into the buffer space in the combination tank. In this flushing step, it is desirable that the cleaning agent clean the surface of the membrane, and not consume any of the contents, e.g. the solid and oil particles, which are in the fluid.

3. The flushing stage can preferably be conducted at a higher temperature.

4. The flushing of the solid particles released during the cleaning at high temperature from the membrane, can then be carried back into the combination tank.

The combination tank would then generally contain the majority of the dirt particles which have been released from the membrane and the pollutants from the bilge. If the process were now started all over again, the solid and oil particles would essentially immediately be re-deposited back onto the membrane, so that repeated flushings would typically be required. To avoid the necessity of such repeated flushings, the combination tank can include a solid material filter, which can preferably eliminate most of the solid material, and the water or the liquid phase can be returned to the combination tank or can be pumped into another container, possibly even the bilge, for future processing.

With the solid material filter present, various safety measures essentially become necessary, for example to prevent the oil which is still in the combination tank from flowing through the solid material filter. Such a safety measure can preferably be achieved by means of an appropriately installed probe, which probe preferably is positioned to take measurements and guarantee that a certain quantity of oil cannot get into the solid material filter. For example, the probe can be installed in a pipe leading to the solid material filter, and when the probe detects the presence of an amount of oil, the probe could automatically shut down, or reverse flow of the pumps.

During the filtration, oil is essentially continuously fed into the combination tank from the membrane system. This oil, which can accumulate at the top of the combination tank over time, can be measured by a sensor and when the boundary layer of oil at the top of the tank reaches a certain thickness, the oil layer can preferably be removed. Such a process can typically ensure that the oil concentration does not go beyond a certain value.

The clean water tank or buffer tank can preferably be used to perform the function described above, and to supply the corresponding amount of permeate to clean the filter module or to displace the dirty water. The ship's own water or seawater cannot be used for this purpose, because such water sources typically do not meet the cleanliness requirements required for this water. The cleanliness requirement is expressed in terms of a KI (colloid index).

A second function of the clean water tank is the isolation of the pressure system acting on the system from outside factors. If the water (permeate) were simply pumped overboard out of the module circuit through the membrane (at the pressure of the membrane circuit), then additional energy, e.g. about one bar to overcome atmospheric pressure, would have to be applied to pump the water overboard. The resulting backpressure would tend to seriously interfere with the normal permeation efficiency. The membrane surface area would have to be significantly increased so that the water would not have to stored in a corresponding buffer tank.

The membrane separator can be combined with other oil removal systems. On ships in particular, oil removal systems are operated, depending on the application, with overpressure or underpressure, with or without filters, with or without coalescers, etc., which are generally equipped with a bilge alarm circuit, as required by IMU 393, i.e. when the limit value is exceeded, the water is pumped back into the bilge. Here it is basically possible to have the device according to the present invention control the other oil removal system by means of a programmable automatic control system, so that, depending on the requirements, it can also be possible to clean the water which cannot be cleaned by the previously-installed, mechanically-operated bilge water oil removal system. The system can also be installed in a variant version, in which there is a collecting tank, in a system with the same outlines, the combination tank is omitted, and only individual elements such as the clean water and flushing agent tank are used, or a combination of all the parts with the exception of the combination tank.

The following safety measure is proposed to prevent a pressure increase caused by the heating of the contents of the module:

During the cleaning process in the closed system, which is very effective, a higher temperature occurs, on account of the closed nature of the system and the pumping energy, and the higher temperature in turn causes a higher pressure. This pressure can be maintained at a constant level by a small pressure relief valve, and can be equalized by regulating the quantity in the combination tank.

In short, the invention can generally be described as follows:

The basic module of this system is a combination tank. In this combination tank, an initial cleaning takes place by normal gravity separation. Then, in a cleaning circuit module, a certain amount of the medium is extracted from the combination tank, concentrated, and the concentrated medium is returned to the combination tank where gravity separation can again be used to clean the medium. The water separated in the module circuit can preferably be pumped overboard. It is thereby important that the volume of medium extracted from the combination filter must be small enough, in relation to the total volume of the combination filter, that the return of the concentrated medium into the combination tank has a low flow, which allows the gravity separation to proceed at all times in the combination tank. To prevent the emulsion from increasing its concentration, which would place an increased load on the cleaning module, the oil separated by gravity is removed quasi-continuously. The water cleaned in the module unit can preferably be flushed overboard via a clean water buffer tank, to eliminate the problem of pressure on the membranes.

Once the membranes in the module unit have reached a specified degree of contamination, a flushing agent can be pumped out of the flushing agent tank into this circuit, to remove the impurities from the membranes, and this mixture of flushing agent and impurities can be returned to the combination tank. Since the dissolved solids can interfere with the further cleaning process, the dissolved solids are preferably removed by means of a solid material filter unit. For this purpose, the contents of the combination tank can be pumped through the solid material filter, and the mixture from which the solid particles have been removed can be returned to the combination tank, or to the bilge. From there, the process can be repeated, and the bilge water can, once again, be pumped into the combination tank.

In summary, one aspect of the invention resides broadly in a ship comprising: an outer hull configured for being borne by water; inner hull apparatus disposed within the outer hull in spaced apart relationship from the outer hull, the inner hull apparatus comprising a plurality of chambers therewithin; a propeller; engine apparatus disposed within one of the chambers of the ship for providing mechanical power to rotate the propeller and move the ship; a bilge area disposed adjacent a bottom portion of the ship; the bilge area being disposed adjacent the outer hull and the inner hull apparatus, and the bilge area being configured for accumulating water therein; pump apparatus for pumping the bilge water out of the bilge area; and processing apparatus for processing the bilge water to remove contaminants therefrom, the processing apparatus comprising: first separation apparatus, the first separation apparatus being configured for receiving the bilge water from the pump apparatus, and the first separation apparatus for separating at least a portion of the contaminant from the bilge water to produce at least partially cleaned bilge water; second separation apparatus for separating at least an additional portion of the contaminant from the at least partially cleaned bilge water to produce a first bilge water fraction and a second bilge water fraction, the first bilge water fraction comprising a substantially clean bilge water fraction, and the second bilge water fraction comprising a bilge water fraction containing the contaminant; apparatus for transferring the at least partially cleaned bilge water from the first separation apparatus to the second separation apparatus; apparatus for transporting at least a portion of the second bilge water fraction back to the first separation apparatus for further separation of the contaminant from the second bilge water fraction; and apparatus for removing the first substantially clean bilge water fraction from the processing apparatus.

Another aspect of the invention resides broadly in a method for operating a ship, the ship comprising: an outer hull; a plurality of chambers located within the outer hull; an engine disposed in one of the plurality of chambers to provide mechanical power and electrical power for the ship; propeller apparatus for driving the ship, the propeller apparatus passing through the outer hull into connection with the engine in the one of the chambers; a bilge area disposed within the outer hull at a low point therein, the bilge area for collecting undesired water within the outer hull, the undesired water picking up contaminants therein from the ship; processing apparatus disposed in one of the plurality of chambers of the ship for processing the bilge water to remove the contaminants therefrom; and pump apparatus for pumping the bilge water out of the bilge area to the processing apparatus, the processing apparatus comprising at least a first separation apparatus and a second separation apparatus in a closed loop, circulating system; the first separation apparatus being configured for receiving the bilge water from the pump apparatus, and the first separation apparatus for separating at least a portion of the contaminant from the bilge water to produce at least partially cleaned bilge water; and the second separation apparatus being configured for separating at least an additional portion of the contaminant from the at least partially cleaned bilge water to produce a first bilge water fraction and a second bilge water fraction, the first bilge water fraction comprising a substantially clean bilge water fraction, and the second bilge water fraction comprising a bilge water fraction containing the contaminant; apparatus for transferring the at least partially cleaned bilge water from the first separation apparatus to the second separation apparatus; and apparatus for transporting at least a portion of the second bilge water fraction back to the first separation apparatus for further separation of the contaminant from the second bilge water fraction; the method comprising: providing chambers within the hull of the ship; configuring the bilge area to be disposed at the low point within the hull; providing the engine in one of the chambers; providing the processing apparatus in one of the chambers; configuring the processing apparatus to have the first separation apparatus for cleaning at least a portion of the contaminant from the bilge water; configuring the processing apparatus to have the second separation apparatus for separating at least an additional portion of the contaminant from the at least partially cleaned bilge water to produce a first bilge water fraction and a second bilge water fraction; providing the pump apparatus for pumping water from the bilge area to the first processing apparatus; providing the apparatus for transferring at least partially cleaned bilge water from the first separation apparatus to the second separation apparatus; providing the apparatus for transporting the second bilge water fraction back to the first separation apparatus from the first separation apparatus; operating the engine to produce mechanical power to drive the propeller and produe electrical power to operate at least the processing apparatus; and the operation of the processing apparatus further comprising the steps of: pumping bilge water from the bilge to the first separation apparatus with the pump apparatus; separating at least a portion of the contaminant from the bilge water to produce at least partially cleaned bilge water; transferring the at least partially cleaned bilge water to the second separation apparatus; separating the at least partially cleaned bilge water into the first bilge water fraction and the second bilge water fraction in the second separation apparatus; removing the first bilge water fraction from the second separation apparatus; and transporting at least a portion of the second bilge water fraction back to the first separation apparatus to remove at least an additional portion of contaminant therefrom.

One additional aspect of the invention resides broadly in a method of cleaning bilge water, in a ship, the ship comprising: a bilge area for collecting water therein, and processing apparatus for processing the bilge water to remove contaminants therefrom, the processing apparatus comprising: at least a first separation apparatus and a second separation apparatus; the first separation apparatus being configured for receiving the bilge water from the bilge to separate at least a portion of the contaminant from the bilge water to produce at least partially cleaned bilge water; and the second separation apparatus being configured for receiving the at least partially cleaned bilge water from the first separation apparatus to separate at least an additional portion of the contaminant from the at least partially cleaned bilge water to produce a first bilge water fraction and a second bilge water fraction, the first bilge water fraction comprising a substantially clean bilge water fraction, and the second bilge water fraction comprising a bilge water fraction containing the contaminant; apparatus for transferring the at least partially cleaned bilge water from the first separation apparatus to the second separation apparatus; and apparatus for transporting at least a portion of the second bilge water fraction back to the first separation apparatus for further separation of the contaminant from the second bilge water fraction; the method comprising: transporting bilge water from the bilge to the first separation apparatus; separating at least a portion of the contaminant from the bilge water in the first separation apparatus to produce at least partially cleaned bilge water; transferring the at least partially cleaned bilge from the first separation apparatus to the second separation apparatus; separating the at least partially cleaned bilge water into the first bilge water fraction and the second bilge water fraction in the second separation apparatus; removing the first bilge water fraction from the second separation apparatus; and transporting at least a portion of the second bilge water fraction containing the contaminant back to the first separation apparatus to remove at least an additional portion of the contaminant therefrom.

BRIEF DESCRIPTION OF THE DRAWING

The process and apparatus according to the present invention are explained in greater detail below, with reference to a system employing the process, which system is indicated by way of example in the figures, in which.

DESCRIPTION OF THE PREFERRED EMBODIMENT

Figure 1:
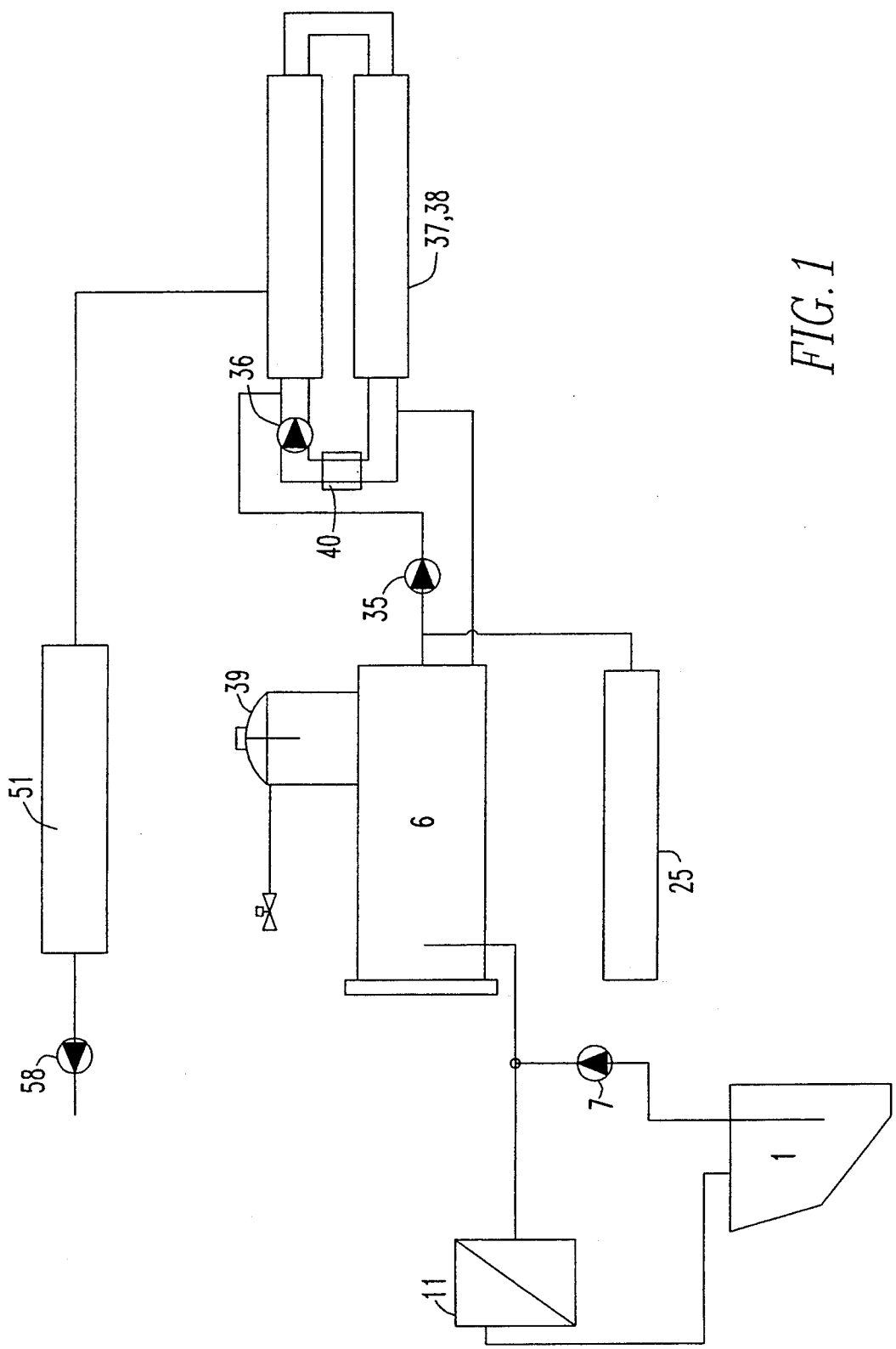
FIGS. 1 and 2 are schematic illustrations of the system with a separation tank ("combination tank"), a fine filter ("module"), a clean water tank, a flushing agent tank, a solid material filter, and the bilge.
Figure 1A:
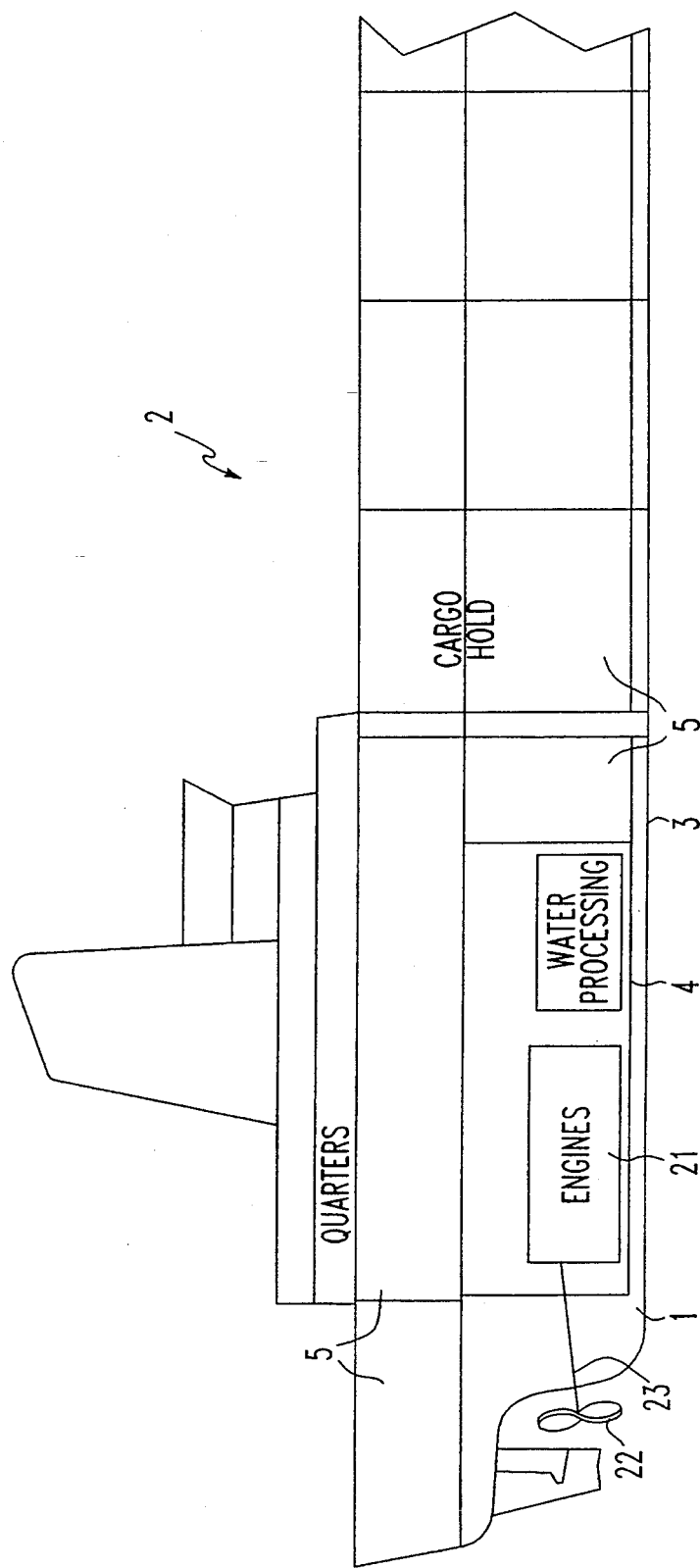
FIG. 1a shows one possible embodiment of a ship having a bilge and apparatus for pumping out the bilge.

FIG. 1a shows one general embodiment of a ship 2. Such a ship typically can have an outer hull 3, as well as preferably an inner hull 4, which inner hull 4 can define the walls and floors of various chambers 5, within the ship. In general, the hulls 3 and 4 can form a bilge area, or simply bilge 1, therebetween.

The various chambers 5 can generally be used for holds for cargo, sleeping quarters, or machinery rooms, etc. For example, the ships engines 21 could be disposed in a lower chamber of the ship to drive the propellers 22, via the propeller shaft 23. In addition, since any water which collects in the bilge 1 may be contaminated by any number of chemicals, or lubricants, etc., such as oil, a ship 2 may also generally be required to have onboard processing equipment for de-contaminating the bilge water before the bilge water is pumped overboard. Further details regarding the overall construction of ships is not included herein, as such construction is generally well-known. In addition, the drawings are meant as examples only, and alternative positioning of such chambers, engines, and processing apparatus are possible.

Figure 2:
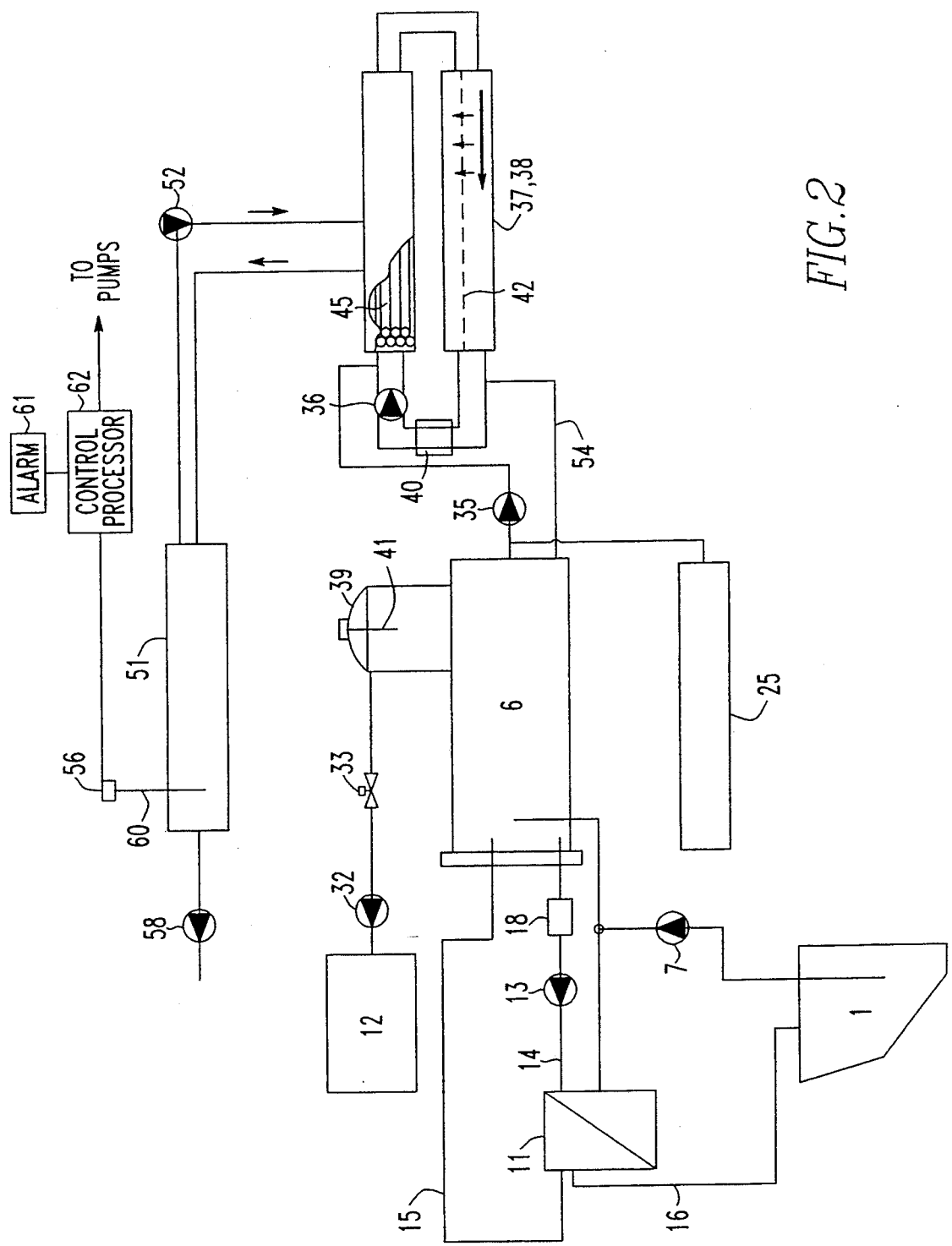

The schematic illustrations shown in FIGS. 1 and 2, indicate variants on one embodiment of the construction of the bilge water processing system according to the present invention. As shown, the principal components of the system preferably include a separation tank 6 and a filter arrangement 37, 38. The filter arrangement preferably comprises an arrangement of fine filters.

Bilge water, which typically collects in the bilge 1, which is located at a low point on the ship, can be transported from the bilge 1, by means of a pump 7 into the separation tank 6. In the separation tank 6, oils present in the water, which oils are less dense than the water, can be separated from the heavier water by gravity, and, as such, the oil will generally collect on the top of the water. To facilitate removal of the oil, the top of the separation tank 6 can preferably be equipped with an oil dome 39. At the top of the oil dome 39, a layer of oil will generally form, and increase in thickness as further oil separation occurs. The oil dome 39 preferably will have a diameter less than the diameter of the separation tank, to thereby cause the oil to form a thicker layer on the surface of the water than would be formed if the dome 39 was not present.

As shown in FIG. 2, the oil dome 39 can preferably be equipped with a probe 41 for monitoring the thickness of the oil layer. Whenever the oil layer reaches a certain thickness, as measured by the probes, the collected lighter oils can be pumped off, via a pump 32 and a valve 33 into a storage tank 12. With such a system, however, the bilge water, which can be extracted from the bottom of the separation tank 6, can still contain amounts of oil which would pose an environmental threat if deposited into the body of water in which the ship was travelling. For this reason, ships 2 generally can require additional separation steps, especially in view of the stricter environmental laws which are being instituted.

The other major component, in accordance with the present invention, includes the fine filter modules 37, 38. These fine filter modules 37, 38 will preferably have a plurality of filter elements, or so-called modules, arranged preferably in series with one another, of which two are shown in the figures. Alternatively such modules could be arranged in parallel so that filtered water from one is passed on to a next, depending on the type of filters used and the desired separation. The task of these fine filter modules 37, 38 is to subject the water from the separation tank 6 to an additional cleaning. Even if oil is removed from the water by gravity, it has been found that an amount of oil can still be present, because gravity alone can often be insufficient to achieve a satisfactory high degree of purity. The filter modules 37, 38 preferably each comprise a fine filter therein and are thus suitable for removing even significantly small residues and other impurities present in the water, so that on the discharge side of the filter modules, high-quality clean water can be produced.

The fine filter in modules 37, 38 can preferably be a ceramic filter, or, in other words, a set of filter tubes 45 with a microfine ceramic coating. The modules of such a filter can preferably be arranged one behind the other, in series and/or parallel depending on the degree of refiltration required. Filters made of fiber are also suitable, however. Such filters, such as the ceramic filters, essentially act like a membrane filter, and are preferably disposed in a direction in which the medium flows through the filter within the modules 37, 38 at an angle to the main flow of the filter module 37, 38. Such an angle can preferably be about 90° with respect to the main flow. In other words, the main direction of flow through the filter modules is preferably parallel to a surface of the filter element disposed within the module. Such a filter surface is generally depicted in the drawings as 42, and this surface 42 is meant to be representative only, for illustrating the above-discussed cross-flow feature. Any water which then passes through the filter element, passes through at an angle with respect to flow direction within the filter module.

The filter station 37, 38 can preferably be designed for the purpose at hand. In itself, it should preferably be a closed system, and a remaining portion of the bilge water, after having been subjected to a secondary cleaning in the filter arrangement 37, 38 can preferably be extracted from the dirty side of the filter surfaces, via piping 54, before a concentrated filter cake can be formed by the concentration of oil particles. This concentrated bilge water can then be pumped back into the separation tank 6, to thereby undergo further gravity separation. This concentrate not only contains a large amount of oil, but also generally contains other residues which can not pass through the filter.

For the microfiltration process, it is generally essential that high transport resistance can be overcome by the filter module. This can be accomplished by subjecting the medium to an elevated pressure in the filter circuit. To pump the medium from the separation tank 6 to the filter arrangement 37, 38, there are preferably provided a circulation pump 36 and a pressurization pump 35 to ensure the circulation of the medium through the elements arranged in series. The presence of these pumps decreases the amount of the oil and other pollutant particles retained on the surface of the filter, by pushing the oil particles through the filter module at speeds which give the oil and other particles essentially no time to deposit on the surface of the filter element, and thereby form solid deposits. Thus, the oils and other pollutant particles can be prevented from clogging the filter pores.

To complete this process, the concentrated oil-water mixture formed in the filter modules, can be returned to the separation tank 6, and because that means that this concentrate must always be free-flowing, if the concentration of the oil is found to have been allowed to increase beyond a certain level, wherein the oil return flow is becoming too viscous, clean water can be returned to the fine filter as necessary from the clean water tank 51, by means of pump 52.

Because the cleaning of the filter surface can be particularly important for this process, a flushing agent can preferably be used. Such a flushing agent can be fed from the flushing agent tank 25 to the fine filter 37, 38. To promote this flushing action, the cleaning water should be heated, e.g. in a heater 40 upstream of the filter station 37, 38.

An additional auxiliary device for cleaning the filter surfaces of the fine filter 37, 38 is a solid materials filter 11 which can preferably be disposed inside the system of the separation tank 6. Solid materials are preferably retained in this filter 11, namely from the feed of fresh bilge water from the bilge 1 and from the medium returned to the separation tank 6 from the fine filter. It is preferable that medium always be extracted from the bottom of the tank 6, preferably via a pump 13 and piping 14, and returned through the solid materials filter 11 to the separation tank 6, via piping 15, or to the bilge 1, via piping 16, to thereby reduce the solids present in the bilge water and increase the amount of time between flushings of the filter arrangement 37, 38, as such solid particles can block the filter pores if not removed from the system. The solids filter 11 thereby preferably reduces the load on the fine filter in the form of solid particles of pollutants being put into contact with the fine filter. This solids filter 11 should preferably be a through-flow filter, or a filter arranged across the path of flow of the medium so that all of the medium would have to pass through the filter. As such, the filter 11 would not be subjected to the cleaning action as present in the filter modules 37, 38, and clogging could more readily occur, especially if exposed to excessive oil concentrations.

For efficient operation, the system can also be equipped with regulation, control and monitoring devices. As discussed previously, a monitoring device 41 can be disposed in the oil dome 39 to activate removal of the collected oil from the oil dome 39. A further monitoring device 18 could be disposed in the piping 14 to monitor the amount of oil present in the bilge water. As discussed previously, the oil can adversely effect the flow, or the usable lifetime of the filter 11, and thus, if an undesirable oil concentration is detected in the bilge water, the pump 13 could be shut down to terminate flow through filter 11 until after a sufficient amount of oil has been removed from the water to reactivate the pump 13. Also, an additional monitoring device 56 with probe 60 could be disposed in the clean water tank 51 to monitor the clean water for contaminants should a failure occur in the filter modules, such as a rupture, etc. This monitoring device 56 along with a control device 62 and an alarm 61, could then in effect shut down operation of the entire system and trigger a signal indicating that a system failure has occurred. Additional monitoring devices, such as flow monitors, level monitors, and additional oil monitors, could be installed in such a system, and use of such devices would be well within the skill of someone designing such a system.

One feature of the invention resides broadly in the process for cleaning bilge water which is contaminated with oil and emulsified on ships, by gravity separation of the oil from the water in a container which is part of a system equipped with pumps and monitoring devices, characterized by the fact that after the start of the separation of the oil fraction from the bilge water, the water which has only been pre-cleaned is continuously pumped out of the separation container, transported to a fine filter, or microfilter, for a secondary cleaning, where it is kept circulating under elevated pressure, whereby the bilge water concentrated there with oil is continuously pumped back from the dirty side of the fine filter into the separation tank, and the floating oil in the separation tank is pumped off, and that the flow velocity in the system is kept low, so that the separation process in the tank remains unaffected by the flow of the medium.

Another feature of the invention resides broadly in the process, characterized by the fact that clean water is filtered as required, a flushing agent is added if necessary, and the clean water is transported to the fine filter to clean it and regenerate it under the required elevated pressure.

Still another feature of the invention resides broadly in the process, characterized by the fact that the liquid is heated during the cleaning process of the fine filter.

Yet another feature of the invention resides broadly in the process, characterized by the fact that pre-cleaned bilge water is pumped out of the separation tank via a solid materials filter (a filter to remove solid materials), and is delivered back to the separation tank or to the bilge.

Still yet another feature of the invention resides broadly in the system for the performance of the process, characterized by the fact that it contains a separation tank 6 "combination tank" for the separation of the oil from the bilge water by gravity, and a downstream fine filter 37, 38 "module" for the secondary cleaning of the pre-cleaned bilge water, whereby pipelines lead from the separation tank 6 to the fine filter 37, 38 and back, and the fine filter 37, 38 also represents a closed circuit system, in which there is a circulation pump 36, which circulates the bilge water there, and upstream of which there is a high pressure pump 35 in the feed line from the separation tank 6.

Another feature of the invention resides broadly in the system, characterized by the fact that the discharge side of the fine filter 37, 38 leads to a collecting tank 51 "clean water tank") equipped with a pump 58 to pump the clean water overboard.

Still another feature of the invention resides broadly in the system, characterized by the fact that there is also a tank 25 for a flushing agent ("flushing agent tank") with an input into the fine filter 37, 38 and a filter 11 "Solid materials filter", which is connected to the separation tank 6, and that there is a bilge 1 with the bilge pump 7 located at a low point on the ship.

Yet still another feature of the invention resides broadly in the system, characterized by the fact that the fine filter 37, 38 is a ceramic filter, whereby the filter elements are located one behind the other, and the tubes coated with a micro-fine ceramic coating.

Another feature of the invention resides broadly in the system, characterized by the fact that the fine filter 37, 38 is constructed of fibers, and consists of filter elements which are located one behind the other.

Still yet another feature of the invention resides broadly in the system, characterized by the fact that in the tube system there are manually-controlled or solenoid valves to regulate the flow of bilge water and clean water, and that there are corresponding measurement devices, monitors and alarm devices to monitor the levels of the bilge water, the separated oil and the clean water, and to measure the levels in the tanks.

Examples of a devices for monitoring contaminants, such as oil in bilge water, are disclosed by the following U.S. Patents: U.S. Pat. No. 4,102,177 to Okada et al., entitled "Densitometer"; U.S. Pat. No. 4,315,822 to Jaisinghani, entitled "Process and Apparatus for Separating Liquids"; U.S. Pat. No. 4,446,370 to Gergely, entitled "Apparatus for Detecting Oil in Water";

Some examples of gravity separators, and process for using such separators are disclosed in the following U.S. Patents: U.S. Pat. No. 5,227,071 to Torline and Williams, entitled "Method and Apparatus for Processing Oily Wastewater"; U.S. Pat. No. 4,619,771 to Stall et al., entitled "Technique for increased retention time in Oil Field Settling Tanks"; and U.S. Pat. No. 4,315,822 to Jaisinghani, entitled "Process and Apparatus for Separating Liquids".

Some examples of using filtration for separating oil and water are disclosed by the following U.S. Patents: U.S. Pat. No. 4,535,615 to Ebben, entitled "Process and Apparatus Using Ultra-Filtration in the Production of Can Shells"; U.S. Pat. No. 4,315,822 to Jaisinghani, entitled "Process and Apparatus for Separating Liquids"; U.S. Pat. No. 4,865,742 to Falletti, entitled Method of Treating Polluted Oil-in-water Emulsions or Microemulsions; and U.S. Pat. No. 4,313,830 to Tulin, entitled Method for Increasing the Cross-Flow Microfiltration Fluxes of Waste Waters Containing Suspended Solids and/or Emulsified Oil". In addition, U.S. Pat. No. 4,652,376 to Kumaoka, entitled "Method for Disposing Emulsified Oil-Containing Waste Water" discloses using ceramic as a filter media.

Some examples of flushing of filters can be found in the following U.S. Patents: U.S. Pat. No. 5,145,033 to Bedi and Van-der-Griendt, entitled "Sandwich Adapter Reusable Oil Filter Mounted to Same and Process for Using the Same"; U.S. Pat. No. 5,062,398 to Bedi and Van-der-Griendt, entitled "Apparatus and Method for Changing Oil in an Internal Combustion Engine with Optional Flushing"; U.S. Pat. No. 4,619,769 to Gritters, entitled Process for Regenerating Media Filters Used to Filter Geothermal Brine"; and U.S. Pat. No. 4,581,135 to Gerulis, entitled "Self-Cleaning Fluid Filter With a Drain".

All, or substantially all, of the components and methods of the various embodiments may be used with at least one embodiment or all of the embodiments, if any, described herein.

All of the patents, patent applications and publications recited herein, if any, and in the Declaration attached hereto, are hereby incorporated by reference as if set forth in their entirety herein.

The corresponding foreign patent publication applications, namely, Federal Republic of Germany Patent Application No. P 42 31 837, filed on Sep. 23, 1992, having inventors Frank Fischer, Knut Drohula and Harm Lüneberg, and DE-OS P 42 31 837 and DE-PS P 42 31 837, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A ship comprising:
   an outer hull configured for being borne by water;
   inner hull means disposed within the outer hull in spaced apart relationship from the outer hull, said inner hull means comprising a plurality of chambers therewithin;
   a propeller;
   engine means disposed within one of said chambers of said ship for providing mechanical power to rotate said propeller and move said ship;
   a bilge area disposed adjacent a bottom portion of the ship;
   the bilge area being disposed adjacent said outer hull and said inner hull means, and said bilge area being configured for accumulating water therein;
   pump means for pumping the bilge water out of said bilge area; and
   processing means for processing the bilge water to remove contaminants therefrom, said processing means comprising:
   first separation means, said first separation means being configured for receiving the bilge water from the pump means, and said first separation means for separating at least a portion of the contaminant from the bilge water to produce at least partially cleaned bilge water;
   said first separation means comprises a gravity separation chamber, said gravity separation chamber being configured for allowing at least free contaminant to float on top of the bilge water;
   said first separation means comprises means for removing the floating contaminant off of the top of the bilge water;
   second separation means for separating at least an additional portion of the contaminant from the at least partially cleaned bilge water to produce a first bilge water fraction and a second bilge water fraction, the first bilge water fraction comprising a substantially clean bilge water fraction, and the second bilge water fraction comprising a bilge water fraction containing the contaminant;
   means for transferring the at least partially cleaned bilge water from said first separation means to said second separation means;
   means for transporting at least a portion of the second bilge water fraction back to said first separation means for further separation of the contaminant from the second bilge water fraction; and
   means for removing the first substantially clean bilge water fraction from said processing means;
   said second separation means comprises filter means;
   said filter means comprises a first surface for being disposed adjacent the at least partially cleaned bilge water from said first separation means;
   said filter means being configured for passage of said first substantially clean bilge water fraction therethrough while inhibiting passage of the contaminants therethrough at at least said first surface of said filter means;
   second pump means for flowing the at least partially cleaned bilge water over said first surface of said filter means, said second pump means being configured for flowing the at least partially cleaned bilge water over said first surface at a velocity sufficient to substantially inhibit accumulation of the contaminants on said first surface of said filter means;
   said second separation means comprises a flow-through chamber configured for passage of the at least partially cleaned bilge water therethrough in a first flow direction;
   said flow-through chamber having a longitudinal dimension, said first flow direction being substantially parallel to said longitudinal dimension of said chamber;
   said first surface of said filter means has a longitudinal dimension, said longitudinal dimension of said first surface for being disposed in a direction substantially parallel to said longitudinal dimension of said flow-through chamber, said at least partially cleaned bilge water flowing over said first surface of said filter means in said longitudinal direction of said filter chamber;
   said first substantially cleaned bilge water fraction flowing through said filter means in a second flow direction, said second flow direction being substantially perpendicular to said first flow direction;
   said processing means further comprises third pump means for continuously circulating the bilge water between said first separation means and said second separation means at a first velocity and a first flow volume, said third pump means comprising a portion of said means for transferring and said means for transporting;

said second pump means is configured for continuously circulating bilge water through at least said second separation means at a second velocity, a second flow volume, and a pressure;

said second velocity is substantially greater than said first velocity and said second pressure is substantially greater than said first pressure; and said pressure being a pressure sufficient to force said at least partially cleaned bilge water through said filter means to form said first substantially clean bilge water fraction.

2. The ship according to claim 1, wherein said means for removing floating contaminants comprises fourth pump means for pumping the floating contaminants off of the top of the bilge water; and said processing means further comprises:

means for introducing a flushing agent into said second separation means, said flushing agent comprising a material for loosening accumulations of contaminants from said first surface of said filter means;

a storage tank for holding said first substantially cleaned bilge water fraction;

means for back-washing said filter means with said substantially cleaned first bilge water fraction from said storage tank, said means for back-washing comprising fifth pump means for flowing said substantially cleaned first bilge water fraction back through said filter means in a flow direction opposite to said second flow direction; and heating means for heating the flushing agent and said substantially cleaned first bilge water fraction circulating in said second separation means during a flushing of said second separation means to facilitate flushing of accumulations of contaminants from said first surface of said filter means.

3. The system according to claim 2, wherein:

the contaminant substantially comprises oil;

said at least partially cleaned bilge water is continuously circulated between said first and said second separation means, and said at least partially cleaned bilge water is continuously circulated within said second separation means;

said gravity separation chamber has a top portion, and a horizontal cross-sectional area, said gravity separation chamber comprises:

an oil collection dome disposed at the top portion of said gravity collection chamber, the oil collection dome having a horizontal cross-sectional area, the horizontal cross-sectional area of the oil collection dome being substantially less than the horizontal cross-sectional area of the gravity separation chamber to produce a thicker layer of oil for a specified oil volume;

monitoring means for controlling operation of said fourth pump means, said monitoring means comprising probe means for measuring a thickness of the layer of oil floating on top of the bilge water within the oil collection dome, said monitoring means being configured for starting said fourth pump means when said oil layer reaches a first predetermined thickness and stopping said fourth pump means when said oil layer thickness falls below a second predetermined thickness, said second predetermined thickness being less than said first predetermined thickness;

said processing means further comprises:

a flow-through filter for filtering solid materials from said bilge water; and means for flowing at least one of:

contaminated bilge water directly from the bilge, and the at least partially cleaned bilge water from said gravity separation chamber through said flow-through filter;

sixth pump means for pumping water out of said storage tank for holding said first substantially cleaned bilge water fraction and off of the ship;

said filter means of said second separation means comprising at least two of said flow-through chambers having said first surfaces therein, said at least two flow-through chambers being disposed in series, one after another;

each of said at least two flow-through chambers comprising filter tubes defining said first surface, said filter tubes comprising at least one of:

tubes coated with a micro-fine ceramic coating; and tubes constructed of fibers;

said storage tank for holding said first substantially cleaned bilge water fraction comprises second monitoring means to measure the purity of said first substantially cleaned bilge water fraction, said second monitoring means comprising:

probe means for measuring a concentration of oil in the first bilge water fraction;

alarm means for signalling an undesirable oil concentration level in the first bilge water fraction; and control means for shutting down said processing means upon detection of said undesirable amount of oil in said first bilge water fraction;

said second velocity comprises a velocity within a range of about 2 meters per second to about 7 meters per second; and said second flow volume comprises a flow volume in a range of about 50 cubic meters per hour to about 100 cubic meters per hour.

4. A method for operating a ship, the ship comprising: an outer hull; a plurality of chambers located within the outer hull; an engine disposed in one of said plurality of chambers to provide mechanical power and electrical power for the ship; propeller means for driving the ship, the propeller means passing through the outer hull into connection with the engine in the one of said chambers; a bilge area disposed within the outer hull at a low point therein, the bilge area for collecting undesired water within the outer hull, the undesired water picking up contaminants therein from the ship; processing means disposed in one of said plurality of chambers of the ship for processing the bilge water to remove the contaminants therefrom; and pump means for pumping the bilge water out of the bilge area to the processing means, said processing means comprising at least a first separation means and a second separation means in a closed loop, circulating system; said first separation means being configured for receiving the bilge water from the pump means, and said first separation means for separating at least a portion of the contaminant from the bilge water to produce at least partially cleaned bilge water; and said second separation means being configured for separating at least an additional portion of the contaminant from the at least partially cleaned bilge water to produce a first bilge water fraction and a second bilge water fraction, the first bilge water fraction comprising a substantially clean bilge water fraction, and the second bilge water fraction comprising a bilge water fraction containing the contaminant; means for transferring the at least partially cleaned bilge water from said first separation means to said second separation means; and means for transporting at least a portion of the second bilge water fraction back to said first separation means for further separation of the contaminant from the second bilge water fraction; said first separation means comprises a gravity separation chamber, said second separation means comprises filter means said filter means comprises a first surface for being disposed adjacent the at least partially cleaned bilge water from said first separation system, said second separation means comprises a flow-through chamber configured for passage of the at least partially cleaned bilge water therethrough in a first flow direction; said flow-through chamber having a longitudinal dimension, said first flow direction being substantially parallel to said longitudinal dimension of said chamber; said first surface of said filter means has a longitudinal dimension, and said longitudinal dimension of said filter means for being disposed in a direction substantially parallel to said longitudinal dimension of said flow-through chamber, said method comprising:
- providing chambers within the hull of the ship;
- configuring the bilge area to be disposed at the low point within the hull;
- providing the engine in one of the chambers;
- providing said processing means in one of the chambers;
- configuring said processing means to have said first separation means for cleaning at least a portion of the contaminant from the bilge water;
- configuring said processing means to have said second separation means for separating at least an additional portion of the contaminant from the at least partially cleaned bilge water to produce a first bilge water fraction and a second bilge water fraction;
- providing said pump means for pumping water from the bilge area to said processing means;
- providing said means for transferring at least partially cleaned bilge water from said first separation means to said second separation means;
- providing said means for transporting the second bilge water fraction back to said first separation means from said second separation means;
- operating the engine to produce mechanical power to drive the propeller and produe electrical power to operate at least said processing means;
- said operation of said processing means further comprising the steps of:
  - pumping bilge water from the bilge to said first separation means with said pump means;
  - floating at least a portion of the free contaminant on top of the bilge water in said gravity separation chamber;
  - removing the floating contaminant off of the top of the bilge water to produce at least partially cleaned bilge water in said gravity separation chamber;
  - transferring the at least partially cleaned bilge water to said second separation means;
  - passing at least a portion of the at least partially cleaned bilge water through said filter means to separate the at least partially cleaned bilge water into the first bilge water fraction and the second bilge water fraction in said second separation means;
  - removing the first bilge water fraction from said second separation means;
  - inhibiting passage of the contaminants through said filter means at at least said first surface of said filter means;
  - flowing the at least partially cleaned bilge water over said first surface of said filter means at a velocity sufficient to substantially inhibit accumulation of the contaminants on said first surface of said filter means;
  - inhibiting accumulation of the contaminant on said first surface of said filter means;
  - transporting at least a portion of the second bilge water fraction back to said first separation means to remove at least an additional portion of contaminant therefrom;
  - flowing the at least partially cleaned bilge water over said first surface of said filter means in said longitudinal direction of said filter chamber;
  - flowing said first substantially cleaned bilge water fraction through said filter means in a second flow direction, said second flow direction being substantially perpendicular to said first flow direction;
  - continuously circulating the at least partially cleaned bilge water between said first separation means and said second separation means at a first velocity and a first flow volume;
  - continuously circulating the at least partially cleaned bilge water through at least said second separation means at a second velocity, a second flow volume and a pressure;
  - said second velocity being substantially greater than said first velocity and said second pressure being substantially greater than said first pressure, said first flow volume being sufficiently low to enable separation of the at least a portion of the contaminant from the bilge water in said first separation means; and
  - said pressure being a pressure sufficient to force the at least partially cleaned bilge water through said filter means to form said first substantially clean bilge water fraction, and said method further includes forcing the at least partially cleaned bilge water through said filter means to form said first substantially clean bilge water fraction.

5. The method according to claim 4, further comprising the steps of:
- introducing a flushing agent into said second separation means, said flushing agent comprising a material for loosening accumulations of contaminants from said first surface of said filter means;
- flowing said first substantially cleaned bilge water fraction into a storage tank;
- back-washing the filter with said substantially cleaned first bilge water fraction from said storage tank, said back-washing comprising flowing said substantially cleaned first bilge water fraction back through said filter means in a flow direction opposite to said second flow direction to flush accumulations of contaminant out of pores of said filter means; and heating the flushing agent and said substantially cleaned first bilge water fraction circulating in said second separation means during a flushing of said second separation means.

6. The method according to claim 5, wherein:

said contaminant substantially comprises oil;

said gravity separation chamber has a top portion, and a horizontal cross-sectional area, and said gravity separation chamber comprises:

third pump means for pumping floating contaminants off the top of the bilge water within said gravity separation chamber;

an oil collection dome disposed at the top portion of said gravity collection chamber, the oil collection dome having a horizontal cross-sectional area, the horizontal cross-sectional area of the oil collection dome being substantially less than the horizontal cross-sectional area of the gravity separation chamber to produce a thicker layer of oil for a specified oil volume; and monitoring means for controlling operation of said third pump means, said monitoring means comprising probe means for measuring a thickness of the layer of oil floating on top of the bilge water within the oil collection dome, said monitoring means being configured for starting said third pump means when said oil layer reaches a first predetermined thickness and stopping said third pump means when said oil layer thickness falls below a second predetermined thickness, said second predetermined thickness being less than said first predetermined thickness;

and said method further comprises the steps of:

collecting the oil as an oil layer in said oil collection dome;

measuring the thickness of the oil layer in said oil collection dome with said probe means;

pumping oil from the oil collection dome when the thickness reaches said first predetermined thickness; and stopping said pumping of oil from said oil collection dome when the thickness of the oil layer reaches said second predetermined thickness;

said processing means further comprises a flow-through filter for filtering solid materials from the bilge water, and said method further comprises at least one of:

filtering bilge water pumped directly from the bilge, and filtering at least partially cleaned bilge water from said gravity separation chamber with said flow-through filter to remove solid materials therefrom;

said method further comprises the step of pumping the substantially clean bilge water out of the storage tank and off of the ship with an additional pump means;

said filter means of said second separation means comprises at least two of said flow-through chambers having said first surfaces therein, said at least two flow-through chambers being disposed in series, one after another;

each of said at least two flow-through chambers comprising filter tubes defining said first surface, said filter tubes comprising at least one of:

tubes coated with a micro-fine ceramic coating; and tubes constructed of fibers;

said storage tank for holding said first substantially cleaned bilge water fraction comprises second monitoring means to measure the purity of said first substantially cleaned bilge water fraction, said second monitoring means comprising:

probe means for measuring a concentration of oil in the first bilge water fraction;

alarm means for signalling an undesirable oil concentration level in the first bilge water fraction; and control means for shutting down said processing means upon detection of said undesirable amount of oil in said first bilge water fraction;

said method further comprises the steps of:

monitoring the purity of said substantially cleaned bilge water fraction in said storage tank with said second monitoring means; and at least one of:

signalling an alarm when an undesirable amount of oil is detected in said first bilge water fraction in said storage tank; and automatically shutting down said processing means when an undesirable amount of oil is detected in said first bilge water fraction in said storage tank;

said second velocity comprises a velocity within a range of about 2 meters per second to about 7 meters per second; and said second flow volume comprises a flow volume of about 50 cubic meters per hour to about 100 cubic meters per hour.

7. In a ship, a method of cleaning bilge water, the ship comprising: a bilge area for collecting water therein, and processing means for processing the bilge water to remove contaminants therefrom, said processing means comprising: at least a first separation means and a second separation means; said first separation means being configured for receiving the bilge water from the bilge to separate at least a portion of the contaminant from the bilge water to produce at least partially cleaned bilge water; and said second separation means being configured for receiving the at least partially cleaned bilge water from the first separation means to separate at least an additional portion of the contaminant from the at least partially cleaned bilge water to produce a first bilge water fraction and a second bilge water fraction, the first bilge water fraction comprising a substantially clean bilge water fraction, and the second bilge water fraction comprising a bilge water fraction containing the contaminant; means for transferring the at least partially cleaned bilge water from said first separation means to said second separation means; and means for transporting at least a portion of the second bilge water fraction back to said first separation means for further separation of the contaminant from the second bilge water fraction; said second separation means comprises filter means, said filter means comprises a first surface for being disposed adjacent the at least partially cleaned bilge water from said first separation means, said first separation means comprises a gravity separation chamber, said second separation means comprises a flow-through chamber configured for passage of the at least partially cleaned bilge water therethrough in a first flow direction; said flow-through chamber having a longitudinal dimension, said first flow direction being substantially parallel to said longitudinal dimension of said chamber; said first surface of said filter means has a longitudinal dimension, and said longitudinal dimension of said filter means for being disposed in a direction substantially parallel to said longitudinal dimension of said flow-through chamber, said method comprising:

transporting bilge water from the bilge to said first separation means;

floating at least a portion of the free contaminant on top of the bilge water in said gravity separation chamber;

removing the floating contaminant off of the top of the bilge water to produce at least partially cleaned bilge water in said gravity separation chamber;

transferring the at least partially cleaned bilge water from said first separation means to said second separation means;

passing said at least partially cleaned bilge water through said filter means;

inhibiting passage of the contaminants through said filter means at at least said first surface of said filter means to separate the at least partially cleaned bilge water into the first bilge water fraction and the second bilge water fraction in said second separation means;

flowing the at least partially cleaned bilge water over said first surface of said filter means in said longitudinal direction of said filter chamber, at a velocity sufficient to substantially inhibit accumulation of the contaminants on said first surface of said filter means;

flowing said first substantially cleaned bilge water fraction through said filter means in a second flow direction, said second flow direction being substantially perpendicular to said first flow direction;

inhibiting accumulation of the contaminant on said first surface of said filter means;

removing the first bilge water fraction from said second separation means;

transporting at least a portion of the second bilge water fraction containing the contaminant back to said first separation means to remove at least an additional portion of the contaminant therefrom;

continuously circulating the bilge water between said first separation means and said second separation means at a first velocity and a first flow volume;

continuously circulating the at least partially cleaned bilge water through at least said second separation means at a second velocity and a second flow volume;

said second velocity being substantially greater than said first velocity and said second pressure being substantially greater than said first pressure, said first flow volume being sufficiently low to enable separation of the at least a portion of the contaminant from the bilge water in said first separation means.

8. The method according to claim 7, further comprising the steps of:

introducing a flushing agent into said second separation means, said flushing agent comprising a material for loosening accumulations of contaminants from said first surface of said filter means;

flowing said first substantially cleaned bilge water fraction into a storage tank;

back-washing the filter with said substantially cleaned first bilge water fraction from said storage tank, said back-washing comprising flowing said substantially cleaned first bilge water fraction back through said filter means in a flow direction opposite to said second flow direction to flush accumulations of contaminant out of pores of said filter means; and heating the flushing agent and said substantially cleaned first bilge water fraction circulating in said second separation means during a flushing of said second separation means.

9. The method according to claim 8, wherein:

said continuously circulating the at least partially cleaned bilge water through at least said second separation means comprises circulating the at least partially cleaned bilge water at a pressure sufficient to force the at least partially cleaned bilge water through said filter means to produce said first substantially clean bilge water fraction;

said contaminant substantially comprises oil, and at least a portion of the oil is in a bilge water-oil emulsion;

said gravity separation chamber has a top portion, and a horizontal cross-sectional area, and said gravity separation chamber comprises:

third pump means for pumping floating contaminant from the top of the bilge water in said gravity separation chamber;

an oil collection dome disposed at the top portion of said gravity collection chamber, the oil collection dome having a horizontal cross-sectional area, the horizontal cross-sectional area of the oil collection dome being substantially less than the horizontal cross-sectional area of the gravity separation chamber to produce a thicker layer of oil for a specified oil volume; and monitoring means for controlling operation of said third pump means, said monitoring means comprising probe means for measuring a thickness of the layer of oil floating on top of the bilge water within the oil collection dome, said monitoring means being configured for starting said third pump means when said oil layer reaches a first predetermined thickness and stopping said third pump means when said oil layer thickness falls below a second predetermined thickness, said second predetermined thickness being less than said first predetermined thickness;

and said method further comprises the steps of:

collecting the oil as an oil layer in said oil collection dome;

measuring the thickness of the oil layer in said oil collection dome with said probe means;

pumping oil from the oil collection dome when the thickness reaches said-first predetermined thickness; and stopping said pumping of oil from said oil collection dome when the thickness of the oil layer reaches said second predetermined thickness;

said processing means further comprises a flow-through filter for filtering solid materials from the bilge water, and said method further comprises at least one of:

filtering bilge water pumped directly from the bilge, and filtering at least partially cleaned bilge water from said gravity separation chamber with said flow-through filter to remove solid materials therefrom;

said method further comprises the step of pumping the substantially clean bilge water out of the storage tank and off of the ship with an additional pump means;

said filter means of said second separation means comprises at least two of said flow-through chambers having said first surfaces therein, said at least two flow-through chambers being disposed in series, one after another;

each of said at least two flow-through chambers comprising filter tubes defining said first surface, said filter tubes comprising at least one of:
tubes coated with a micro-fine ceramic coating; and tubes constructed of fibers;

said storage tank for holding said first substantially cleaned bilge water fraction comprises second monitoring means to measure the purity of said first substantially cleaned bilge water fraction, said second monitoring means comprising:
probe means for measuring a concentration of oil in the first bilge water fraction;
alarm means for signalling an undesirable oil concentration level in the first bilge water fraction; and
control means for shutting down said processing means upon detection of said undesirable amount of oil in said first bilge water fraction;

said method further comprises the steps of:
monitoring the purity of said substantially cleaned bilge water fraction in said storage tank with said second monitoring means; and
at least one of:
signalling an alarm when an undesirable amount of oil is detected in said first bilge water fraction in said storage tank; and
automatically shutting down said processing means when an undesirable amount of oil is detected in said first bilge water fraction in said storage tank said second velocity comprises a velocity within a range of about 2 meters per second to about 7 meters per second; and said second flow volume comprises a flow volume of about 50 cubic meters per hour to about 100 cubic meters per hour.

* * * * *